United States Patent
Channell et al.

(10) Patent No.: US 10,428,966 B2
(45) Date of Patent: Oct. 1, 2019

(54) HYDRANT STEM COUPLING WITH RIBS

(71) Applicant: Mueller International, LLC, Atlanta, GA (US)

(72) Inventors: Alan Channell, Albertville, AL (US); Michael Wheatley, Guntersville, AL (US)

(73) Assignee: Mueller International, LLC, Atlanta, GA (US)

( * ) Notice: Subject to any disclaimer, the term of this patent is extended or adjusted under 35 U.S.C. 154(b) by 8 days.

(21) Appl. No.: 15/427,458

(22) Filed: Feb. 8, 2017

(65) Prior Publication Data

US 2018/0223507 A1 Aug. 9, 2018

(51) Int. Cl.
| | | |
|---|---|---|
| F16K 17/40 | (2006.01) | |
| E03B 9/04 | (2006.01) | |
| F16B 7/04 | (2006.01) | |
| F16B 21/12 | (2006.01) | |
| F16K 31/46 | (2006.01) | |

(52) U.S. Cl.
CPC .............. *F16K 17/406* (2013.01); *E03B 9/04* (2013.01); *F16B 7/0413* (2013.01); *F16B 21/12* (2013.01); *F16K 31/46* (2013.01)

(58) Field of Classification Search
CPC .. F16K 17/406; F16L 55/1007; F16L 55/1015
USPC ..................................................... 137/68.14
See application file for complete search history.

(56) References Cited

U.S. PATENT DOCUMENTS

| | | | |
|---|---|---|---|
| 2,018,455 A | | 10/1935 | Lofton |
| 2,286,623 A | * | 6/1942 | Kellaher ................ A01G 25/16 137/522 |
| 3,002,775 A | | 10/1961 | Mueller et al. |
| 3,439,947 A | * | 4/1969 | Luckenbill ................ F16B 7/00 285/4 |
| 3,943,963 A | | 3/1976 | Papacek |
| 4,790,342 A | | 12/1988 | Segal |
| 5,020,934 A | | 6/1991 | Floren et al. |
| 5,503,192 A | * | 4/1996 | Platusich ............ B29C 65/3612 138/112 |
| 6,095,174 A | * | 8/2000 | Miller ....................... E03B 9/02 137/15.02 |
| 6,112,761 A | | 9/2000 | Scotto |

(Continued)

FOREIGN PATENT DOCUMENTS

| | | |
|---|---|---|
| DE | 3928035 | 3/1990 |
| WO | 2018147990 | 8/2018 |

OTHER PUBLICATIONS

Mueller Co.; Brochure for Super Centurion Hydrants; see p. 2; copyright 2015, 6 pgs.

(Continued)

*Primary Examiner* — Marina A Tietjen
*Assistant Examiner* — Paul J Gray
(74) *Attorney, Agent, or Firm* — Taylor English Duma LLP

(57) ABSTRACT

A hydrant includes a hydrant body defining an internal cavity; an upper stem positioned within the internal cavity; a lower stem positioned within the internal cavity; and a stem coupling securing the upper stem to the lower stem, the stem coupling comprising a coupling body defining a main bore that is circular in radial cross-section and sized to receive the upper stem and the lower stem; and a plurality of ribs, each rib extending radially outward from the coupling body.

18 Claims, 6 Drawing Sheets

(56) References Cited

U.S. PATENT DOCUMENTS

| | | | |
|---|---|---|---|
| 9,108,076 B2 | 8/2015 | Sigelaksis | |
| 2006/0016479 A1 | 1/2006 | Gonzales | |
| 2014/0310942 A1* | 10/2014 | Li | F16L 1/10 29/458 |

OTHER PUBLICATIONS

Mueller Co.; Catalog for Mueller AquaGrip System; see pp. 9.3, 9.4, 9.7, 9.9, 9.13, 9.17; publicly available prior to Feb. 8, 2016, 34 pgs.

Mueller Co.; Operating Instructions for Mueller Super Centurion Fire Hydrant, Copyright 1999, 12 pgs.

Mueller Canada Century 2001 Hydrant Stem Guide Coupling: Various views of a stem guide coupling that was publicly available prior to Feb. 8, 2016, 1 pg.

Mueller Safety Stem Coupling: Various views of a safety stem coupling that was publicly available prior to Feb. 8, 2016, 1 pg.

Mueller Stem Centering Spider for Fire Hydrants: Various views of a stem centering spider that was publicly available prior to Feb. 8, 2016, 1 pg.

Channell, Alan; International Search Report for PCT Application No. PCT/US18/14329, filed Jan. 19, 2018, dated Apr. 4, 2018, 11 pgs.

\* cited by examiner

HYDRANT STEM COUPLING WITH RIBS

TECHNICAL FIELD

Field of Use

This disclosure relates to hydrants. More specifically, this disclosure relates to stem couplings in a hydrant.

Related Art

A fluid distribution system such as a municipal water system can comprise a hydrant that can permit ready and reliable above-ground access to water by authorized personnel. The hydrant as defined here can be installed partly below and partly above the ground surface and is typically supplied with water by a substantially horizontal pipe connected to the hydrant and sometimes referred to as a "lateral" pipe extending from a "main" water pipe. The bury depth of the hydrant, which can be measured from the ground surface to a lowermost portion of the aforementioned "lateral," can vary greatly. A stem assembly, typically comprising a lower stem and an upper stem connected to each other with a coupling, is positioned inside the hydrant and can extend from a top of the hydrant to a main valve near the bottom of the hydrant that allows water into or keeps water out of the exposed part of the hydrant. During an accident involving damage to the hydrant, the upper stem can typically break away from the lower stem along with the portion of the hydrant exposed above ground, thereby causing damage to the hydrant by a predictable, sacrificial failure of the coupling.

When the bury depth exceeds a certain distance, however, flex in the stem or damage to the stem caused by the extended length of the stem can cause problems in the operation of the hydrant. To prevent excessive flex in the stem or damage to the stem and other components of the hydrant, a "spider" or spider fitting can be installed about the stem below the coupling connecting the upper stem to the lower stem. A typical spider is difficult to install and remove and can interfere with access to and service of the main valve.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a hydrant comprising: a hydrant body defining an internal cavity; an upper stem positioned within the internal cavity; a lower stem positioned within the internal cavity; and a stem coupling securing the upper stem to the lower stem, the stem coupling comprising a coupling body defining a main bore that is circular in radial cross-section and sized to receive the upper stem and the lower stem; and a plurality of ribs, each rib extending radially outward from the coupling body.

In a further aspect, disclosed is a stem coupling for a hydrant comprising: a coupling body; and a plurality of ribs; each rib extending radially outward from the coupling body and comprising a tapered portion.

In yet another aspect, disclosed is a stem coupling for a hydrant comprising: a coupling body comprising a first end and a second end, the coupling body comprising an interior surface defining a main bore and an internal shoulder, the internal shoulder extending radially inward from the main bore and defining a shoulder bore; and a plurality of ribs; each rib extending radially outward from the coupling body.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
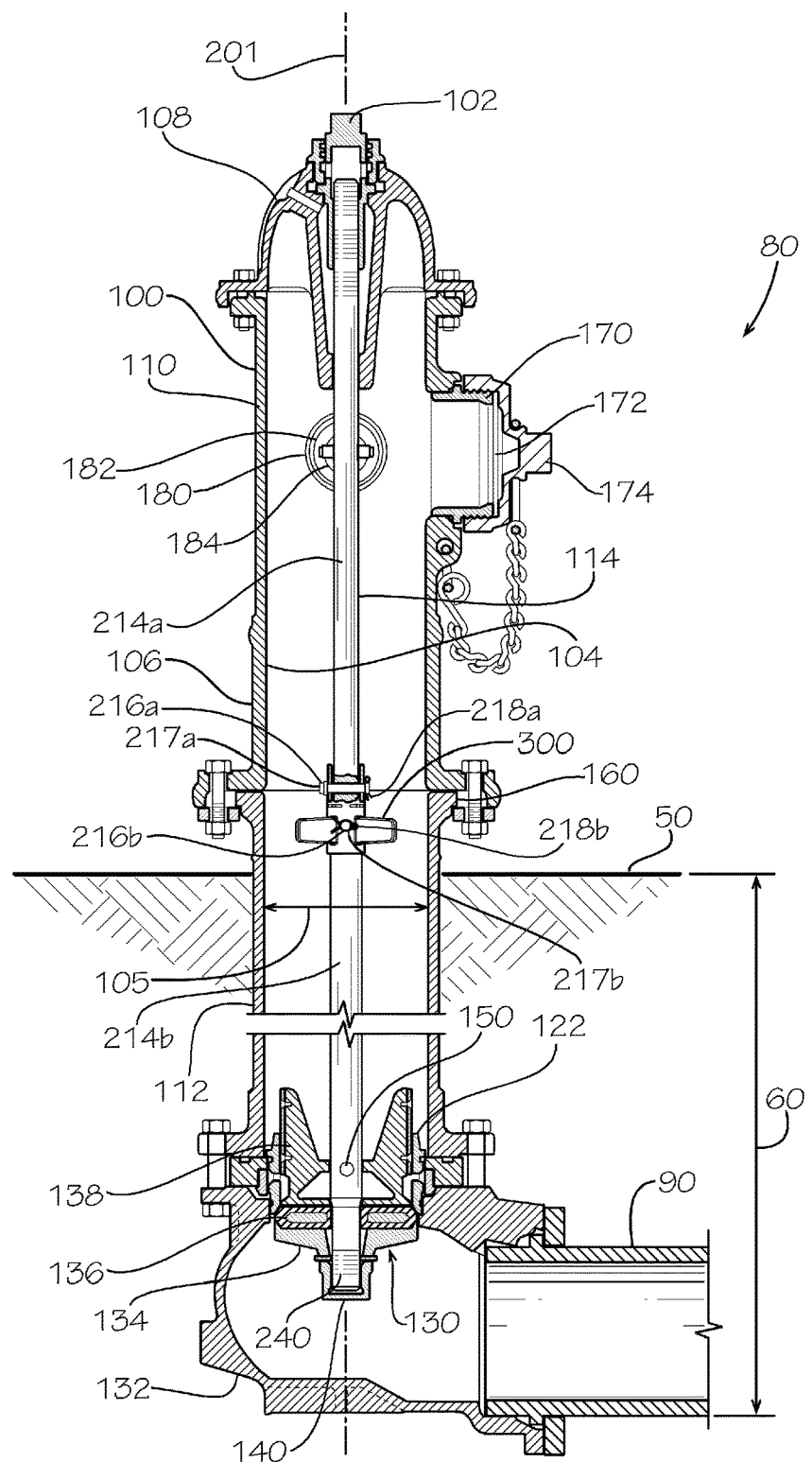
FIG. 1 is a sectional view of a hydrant installed in the ground in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known embodiment. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can include two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

In one aspect, a stem coupling and associated methods, systems, devices, and various apparatuses are disclosed herein. In one aspect, the stem coupling can comprise a coupling body and a plurality of ribs extending from the coupling body.

Hydrants, sometimes referred to more specifically as fire hydrants, are typically included in a municipal (or private) water system for the purpose of extinguishing fires and dispensing water for other purposes. A hydrant, however, can also be used to dispense fluids other than water. Fire hydrants commonly are one of two types: wet-barrel and dry-barrel. In a wet-barrel hydrant, water remains in the hydrant body at all times because the main valve is commonly situated near the top of the a body of the hydrant. In a dry-barrel fire hydrant, the main valve is mounted on or housed in a hydrant shoe at a lower end of the hydrant body and the water is drained from the hydrant body when the main valve is closed.

FIG. 1 shows a fluid distribution system 80 comprising a hydrant 100 and a pipe 90, which can be connected to the hydrant 100. The fluid distribution system 80 and the hydrant 100 forming a portion thereof can be installed partly below and partly above the ground surface 50. A bury depth 60 of the hydrant 100 can be measured from the ground surface 50 to a lowermost portion of an end of the pipe 90 proximate to the hydrant 100. In one aspect, the hydrant 100 can be a dry-barrel fire hydrant comprising a hydrant body 106 defining an internal cavity 104 defining an inner diameter 105. In another aspect, the hydrant 100 can be another type of fire hydrant such as, for example and without limitation, a wet-barrel fire hydrant.

The hydrant body 106 can comprise an upper hydrant barrel 110, a bonnet 108 secured to a top end of the upper hydrant barrel 110, and a lower hydrant barrel 112 secured to a bottom end of the upper hydrant barrel 110. The hydrant 100 can further comprise a hydrant shoe 132 secured to a bottom end of the lower hydrant barrel 112. The hydrant shoe 132 can be secured to a water supply pipe such as the pipe 90 or any other fluid supply pipe. An operating nut 102 can be mounted on, in, or through the bonnet 108. A stem assembly 114 can be secured to the operating nut 102 via a threaded connection and can be positioned within and centered within the internal cavity 104. The stem assembly 114 can comprise an upper stem 214a and a lower stem 214b. The stem assembly 114 can further comprise a stem coupling 300. In one aspect, the stem coupling 300 can join the upper stem 214a and the lower stem 214b with a fastener 216a,b. In one aspect, the fasteners 216a,b can comprise clevis pins 217a,b and cotter pins 218a,b, respectively. In another aspect, the fasteners 216a,b used to secure the upper stem 214a to the lower stem 214b can be another type of fastener such as, for example and without limitation, weldments, screws, or bolts. In yet another aspect, the stem assembly 114 can be a single unit or component.

In one aspect, each of the upper stem 214a, the lower stem 214b, and the stem coupling 300 can be circular in radial cross-section. Advantages of the upper stem 214a, the lower stem 214b, and the stem coupling 300 being circular in radial cross-section can include 1) a more uniform failure mode regardless of the side of the hydrant 100 impacted during an accident, 2) more uniform stresses throughout each part, 3) a better strength-to-weight ratio (including torsional stiffness); and 4) the ability to directly form threads on each of the upper stem 214a and the lower stem 214b.

A valve assembly 130 can be coupled to the lower stem 214b. The valve assembly 130 can comprise a main valve 136, an upper valve plate 138, and a lower valve plate 134. The valve assembly 130 can be coupled to the lower stem 214b by a cap nut 140 and a stem pin 150. The cap nut 140 can be assembled to the lower stem portion 214b by threading 240. The stem pin 150 can extend through the lower stem portion 214b and can secure the lower stem 214b to the upper valve plate 138. In one aspect, the main valve 136 and the lower valve plate 134 can thereby be held between the upper valve plate 138 and the cap nut 140. In another aspect, the valve assembly 130 can be mounted to the stem assembly 114 by other methods such as, for example and without limitation, fasteners, brackets, threading, welding, or gluing (e.g., with adhesive) on the upper valve plate 138 or the lower valve plate 134. In yet another aspect, the lower valve plate 134 may be formed integrally with the stem assembly 114. The hydrant 100 can further comprise a seat ring 122 against which the main valve 136 can seal to close the hydrant, thereby preventing fluid inside the fluid distribution system 80 from flowing from the pipe 90 into the internal cavity 104 of the hydrant body 106.

In the current embodiment, the upper hydrant barrel 110 can comprise a pumper nozzle 170 defining a pumper nozzle outlet 172 and a hose nozzle 180 defining a hose nozzle outlet 182. The pumper nozzle outlet 172 can be covered by a pumper nozzle cap 174 and the hose nozzle outlet 182 can be covered by a hose nozzle cap 184. The pumper nozzle cap 174 and the hose nozzle cap 184 can be removable for attachment of a pumper and a hose, respectively, to the hydrant 100. The pumper nozzle 170 and the hose nozzle 180 can define a threaded connection, a Storz connection (i.e., a non-threaded quarter-turn connection), or any other connection.

To open the hydrant 100, which can allow water to flow from the pipe 90 into the internal cavity 104 of the hydrant body 106, the operating nut 102 can be turned. Turning the operating nut 102 in one direction can lower the valve stem assembly 114 and thereby cause the lower valve plate 134 to urge the main valve 136 away from the seat ring 122. To discontinue water flowing from the pipe 90 to the hydrant body 106, the operating nut 102 can be turned in the opposite direction, raising the valve stem assembly 114 and thereby causing the lower valve plate 134 to urge the main valve 136 towards the seat ring 122 such that the main valve 136 engages the seat ring 122. The hose nozzle outlet 182 and the pumper nozzle outlet 172 can be thereby at least indirectly sealable by the main valve 136.

Figure 2:
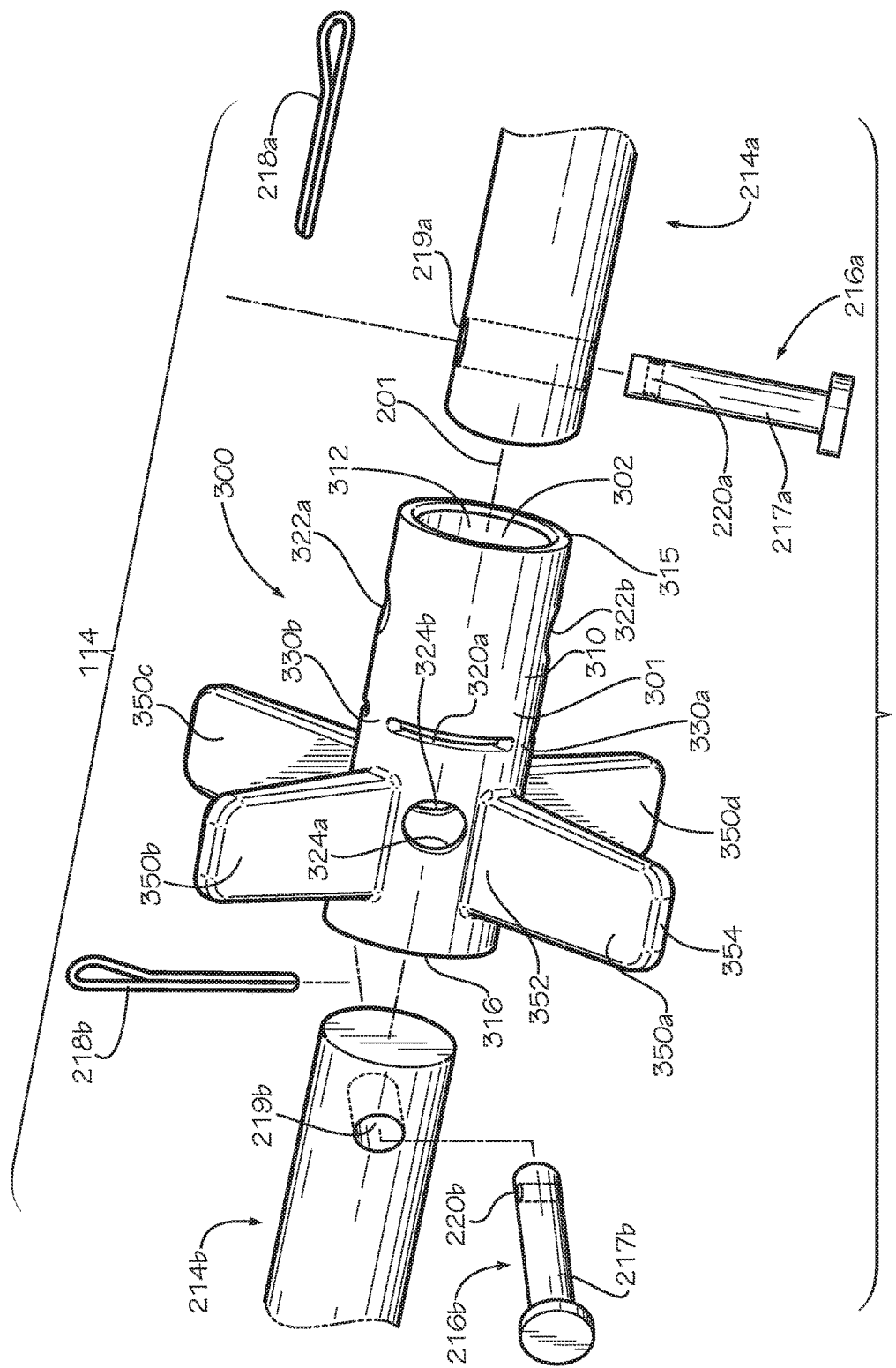
FIG. 2 is an exploded perspective view of an upper stem, a lower stem, and a stem coupling of the hydrant of FIG. 1.

FIG. 2 shows the stem assembly 114, which can comprise the upper stem 214a, the lower stem 214b, and the stem coupling 300. The stem coupling 300 can be secured or coupled along a central axis 201 to each of the upper stem 214a and the lower stem 214b with the fasteners 216a,b. The stem coupling 300 can comprise a coupling body 310. The stem coupling 300 can further comprise a plurality of ribs 350a,b,c,d, which can also be described as fins or wings. The coupling body 310 can comprise an exterior surface 301 and an interior surface 302. The interior surface 302 can define a main bore 312 extending from a first end 315 to a second end 316. In one aspect, the main bore 312 can be circular in radial cross-section. In another aspect, the main bore 312 can have a non-circular shape in radial cross-section. The main bore 312 can be sized to receive a portion of the upper stem 214a and a portion of the lower stem 214b. The coupling body 310 can further comprise at least one break-away feature 320a,b,c (320b,c shown in FIG. 3) that extends from the exterior surface 301 to the interior surface 302. Each pair of adjacent break-away features 320a,b,c can be separated by and defined by conjoining portions 330a,b,c (330c shown in FIG. 3). The coupling body 310 of the stem coupling 300 can further define clearance bores 322a,b and clearance bores 324a,b for respectively receiving the fasteners 216a,b. Each of the plurality of ribs 350a,b,c,d can extend radially outward from the coupling body 310. Each of the plurality of ribs 350a,b,c,d can further comprise a base 352 and a tip 354 that can be distal from the base 352. As shown, the base 352 can be proximate to the coupling body 310, and the tip 354 can be distal from the coupling body 310.

The upper stem 214a and the lower stem 214b can respectively define fastener bores 219a,b for receiving the fasteners 216a,b. In one aspect in which the fasteners 216a,b comprise the clevis pins 217a,b, the fastener bores 219a,b are sized to receive the clevis pins 217a,b. Each of the clevis pins 217a,b can be sized to respectively extend through the fastener bores 219a,b, each of the clevis pins 217a,b extending through one end of the fastener bore 219a of the upper stem 214a and the fastener bore 219b of the lower stem 214b and exiting another end of the respective fastener bores 219a,b of the upper stem 214a and the lower stem 214b. The clevis pins 217a,b can respectively define cotter pin bores 220a,b for receiving the cotter pins 218a,b. The cotter pin bores 220a,b can be sized to receive the cotter pins 218a,b. Each of the cotter pins 218a,b can be sized to extend through one end of the cotter pin bore 220a,b of the clevis pin 217a,b and exit another side of the clevis pin 217a,b. By assembling each of the cotter pins 218a,b to a clevis pin 217a,b through the cotter pin bores 220a,b and bending one or both legs of the cotter pins 218a,b, each of the cotter pins 218a,b can be secured to the clevis pins 217a,b. By securing each of the cotter pins 218a,b to the clevis pins 217a,b after extending the clevis pins 217a,b through the fastener bores 219a,b, the clevis pins 217a,b can be secured to the upper stem 214a and the lower stem 214b, respectively. The stem assembly 114 can be assembled by simultaneously installing the clevis pins 217a,b through the stem coupling 300, the upper stem 214a, and the lower stem 214b. In another aspect, the fasteners 216a,b can be any one of various types of mechanical fasteners such as, for example and without limitation, pins, screws (including set screws), and bolts. Each of the fasteners 216a,b can be readily removable (i.e., configured to be removable with tools or by hand and without destroying the fastener 216a,b or the parts that it joins).

Figure 3:
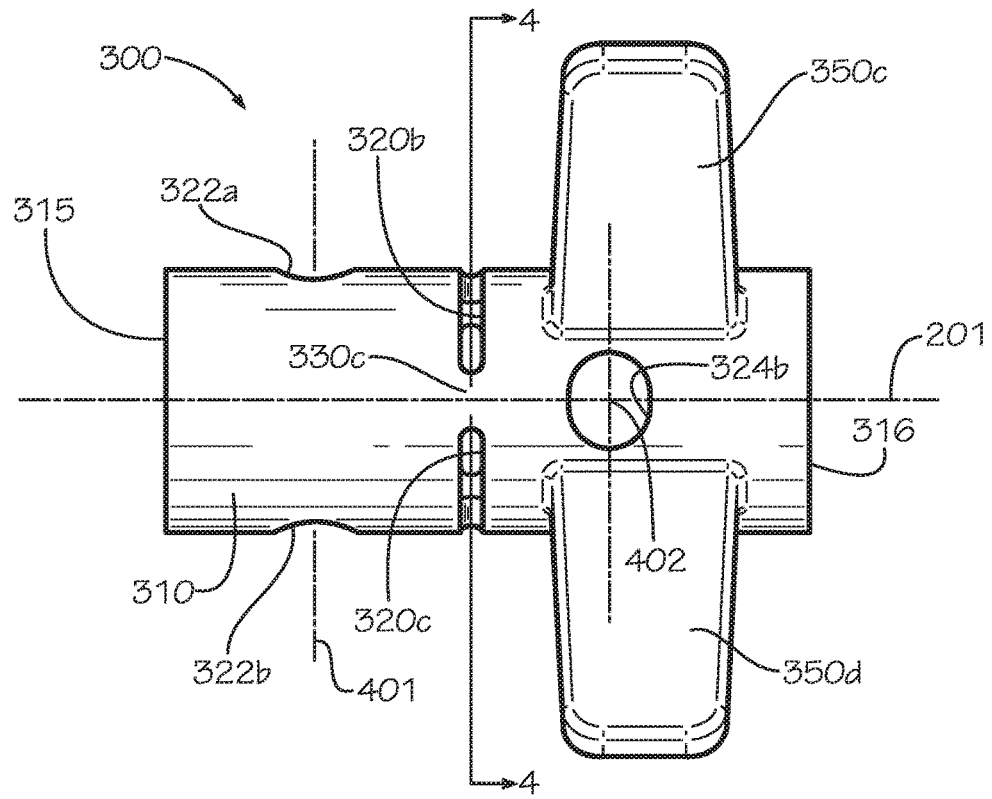
FIG. 3 is a side view of the stem coupling of FIG. 2.

As shown in FIG. 3, showing a side view of the stem coupling 300, the coupling body 310 of the stem coupling 300 can comprise the conjoining portions 330a,b,c and define the break-away features 320b,c. As shown, the clearance bores 322a,b can be aligned along a first transverse axis 401 that can be positioned an angular distance 403 (shown in FIG. 5) of 90 degrees with respect to a second transverse axis 402 along which the clearance bores 324a,b are aligned. The clearance bores 322a,b can also be referred to together as a first cross bore 322, and the clearance bores 324a,b can also be referred to together as a second cross bore 324. The first cross bore 322 comprising the clearance bores 322a,b can be positioned between the first end 315 and the break-away features 320a,b,c. The second cross bore 324 comprising the clearance bores 324a,b can be positioned between the second end 316 and the break-away features 320a,b,c. In one aspect, each of the break-away features 320a,b,c can be a break-away slot having a width measured in an axial direction that extends along the central axis 201 of the stem coupling 300 and a length measured in a circumferential direction that wraps around the coupling body 310. Each of the conjoining portions 330a,b,c can also have a width measured in an axial direction that extends along the central axis 201 of the stem coupling 300 and a length measured in a circumferential direction that wraps around the coupling body 310.

Figure 4:
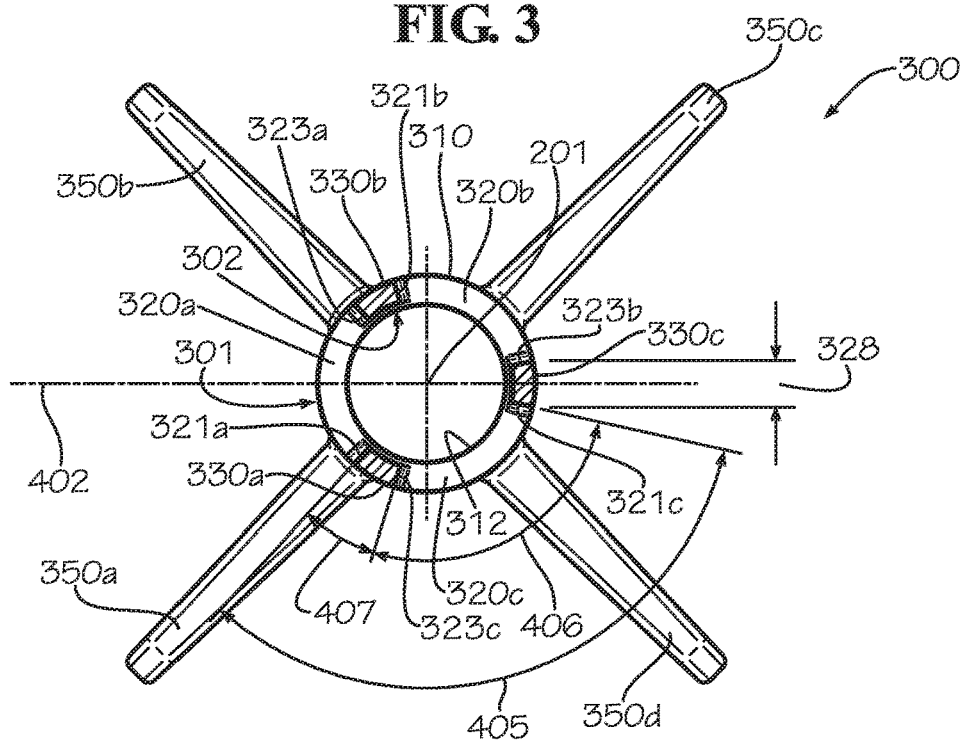
FIG. 4 is a sectional view of the stem coupling of FIG. 2 taken along line 4-4 of FIG. 3.

As shown in FIG. 4, showing a sectional view of the stem coupling 300, the break-away features 320a,b,c can be spaced circumferentially at regular intervals around the coupling body 310. In one aspect, a first end 321a,b,c of each break-away feature 320a,b,c can be spaced away from a second end of the same break-away feature 320a,b,c by an angular distance 406 of about 95 degrees, and each of the first ends 321a,b,c of the respective break-away features 320a,b,c can be spaced away from a respective second end 323a,b,c of the adjacent break-away feature by an angular distance 407 of about 25 degrees. In such aspect, each of the conjoined portions 330a,b,c extend the same angular distance 407 around the coupling body 310 at the thinnest portion of each of the conjoining portions 330a,b,c. An angular distance 405, a sum of the angular distance 406 and the angular distance 407, can thus total about 120 degrees. In other words, the first end 321*a* of the break-away feature 320*a* can be positioned at the angular distance 405 of about 120 degrees behind the first end 321*c* of the break-away feature 320*c*, the first end 321*c* of the break-away feature 320*c* can be positioned the angular distance 405 of about 120 degrees behind the first end 321*b* of the break-away feature 320*b*, and the first end 321*b* of the break-away feature 320*b* can be positioned the angular distance 405 of about 120 degrees behind the first end 321*a* of the break-away feature 320*a*. In such aspect, the three break away features 320*a,b,c* and the three conjoining portions 330*a,b,c* can extend a full 360 degrees around the circumference of the coupling body 310. In another aspect, the break-away features 320*a,b,c* and the three conjoining portions 330*a,b,c* can be spaced circumferentially at irregular intervals around the coupling body 310. In another aspect, the coupling body 310 can comprise less than three or greater than three of each of the break-away features 320 and the conjoining portions 330 and can likewise result in angular distances 405,406,407 that are less than or greater than the angular distances 405,406, 407 shown. In one aspect, the angular distance 407 is about 20.8% of the angular distance 405. In another aspect, the angular distance 407 can be either more or less than about 20.8% of the angular distance 405. A distance 328 can be measured from each of the first ends 321*a,b,c* of the respective break-away features 320*a,b,c* to each of the respective second ends 323*a,b,c* of the adjacent break-away feature when viewed from along the axis 402.

Figure 5:
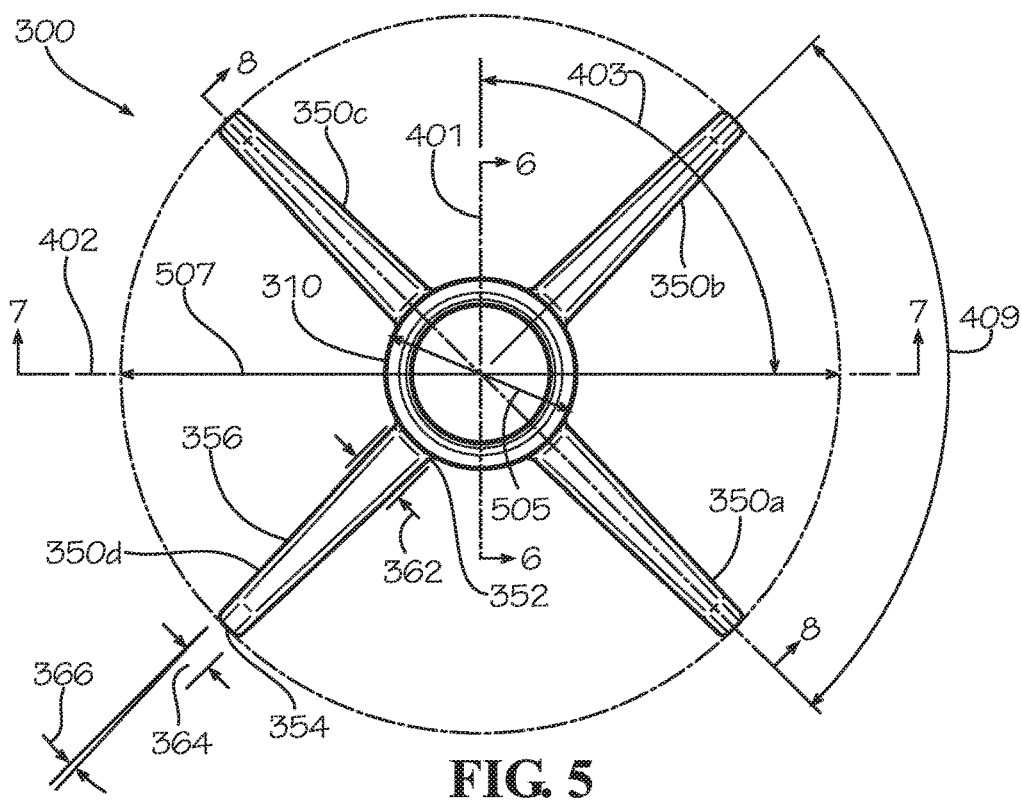
FIG. 5 is a bottom view of the stem coupling of FIG. 2.
Figure 6:
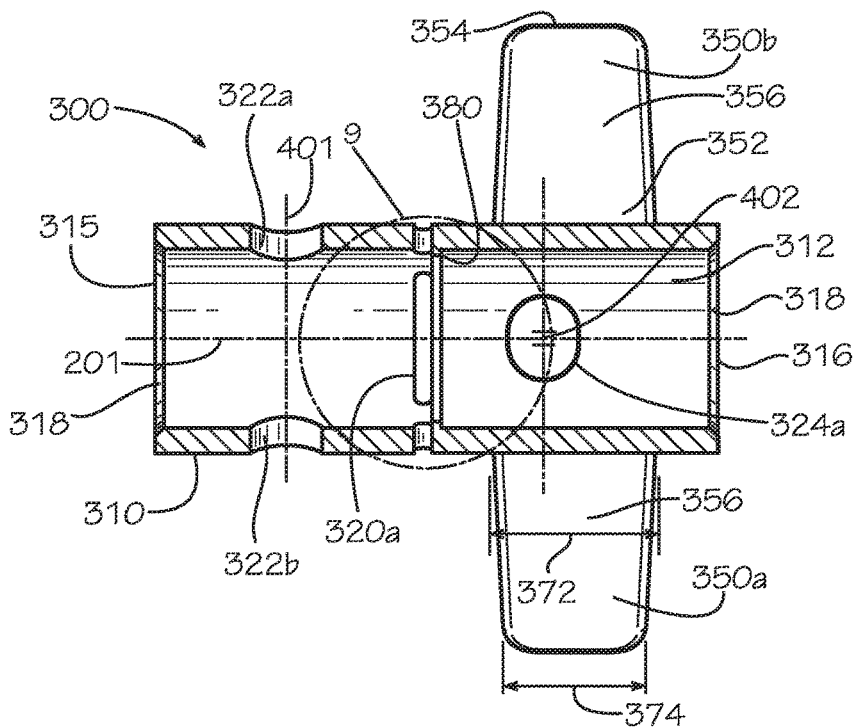
FIG. 6 is a sectional view of the stem coupling of FIG. 2 taken along line 6-6 of FIG. 5.
Figure 7:
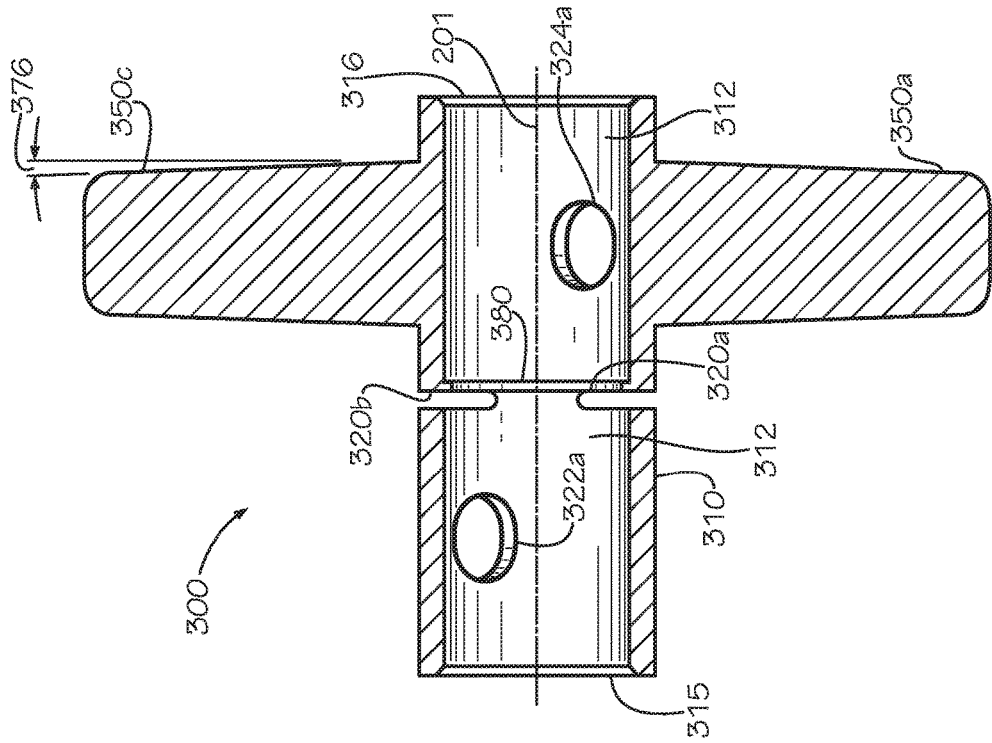
FIG. 7 is a sectional view of the stem coupling of FIG. 2 taken along line 7-7 of FIG. 5.
Figure 8:
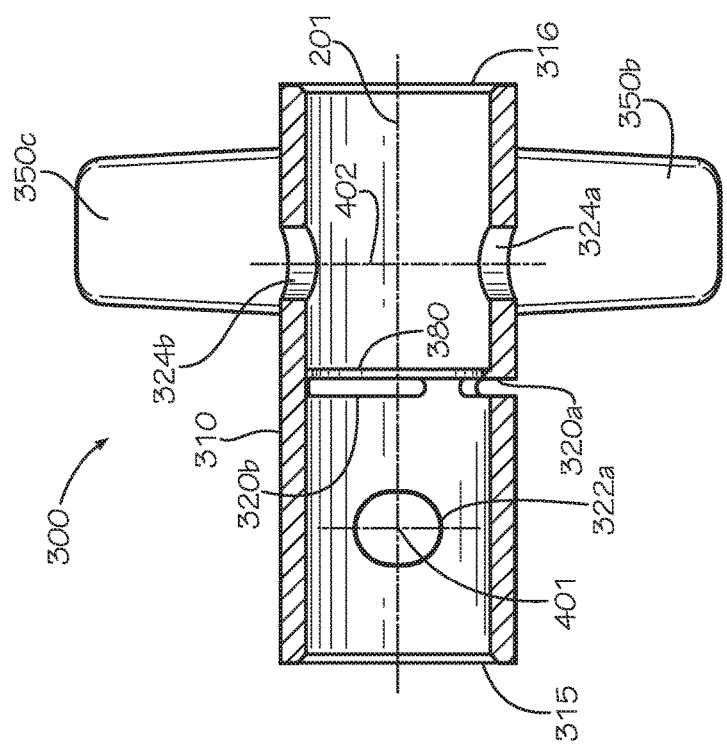
FIG. 8 is a sectional view of the stem coupling of FIG. 2 taken along line 8-8 of FIG. 5.

As shown in FIG. 5, showing a bottom view of the stem coupling 300, each rib 350*a,b,c,d* can comprise a tapered portion 356 extending from the base 352 to the tip 354. In one aspect, a thickness 364 of a radial cross-section of each rib 350*a,b,c,d* proximate to the tip 354 can be less than a thickness 362 of a radial cross-section of each rib 350*a,b,c,d* proximate to the base 352. In one aspect, each of the plurality of ribs 350*a,b,c,d* can define a taper angle 366 of about 2 degrees. In another aspect, each of the plurality of ribs 350*a,b,c,d* can define a taper angle 366 of greater than or less than about 2 degrees. The coupling body 310 can define a body outer diameter 505. The coupling body and the ribs 350*a,b,c,d* can define an overall diameter 507. Each of the ribs 350*a,b,c,d* can be spaced from each adjacent rib 350*a,b,c,d* by an angular distance 409 of about 90 degrees.

FIGS. 6-9 show several axial cross-sections of the stem coupling 300. As shown in FIGS. 6-9, the coupling body 310 can further define an internal shoulder 380 extending radially inward from the main bore 312. As previously described, each rib 350*a,b,c,d* can comprise the tapered portion 356 extending from the base 352 to the tip 354. In one aspect, a thickness 374 of an axial cross-section of each rib 350*a,b,c,d* proximate to the tip 354 as shown can be less than a thickness 372 of an axial cross-section of each rib 350*a,b,c,d* proximate to the base 352 as shown. In one aspect, each of the plurality of ribs 350*a,b,c,d* can define a taper angle 376 (shown in FIG. 8) of about 2 degrees. In another aspect, each of the plurality of ribs 350*a,b,c,d* can define a taper angle 376 of greater than or less than about 2 degrees. In one aspect, the coupling body can define a edge relief 318 at the first end 315 and the second end 316 to ease insertion of the upper stem 214*a* and the lower stem 214*b*, respectively. As shown, each of the plurality of ribs 350*a, b,c,d* can be positioned between the break-away features 320*a,b,c* and the second end 316.

Figure 9:
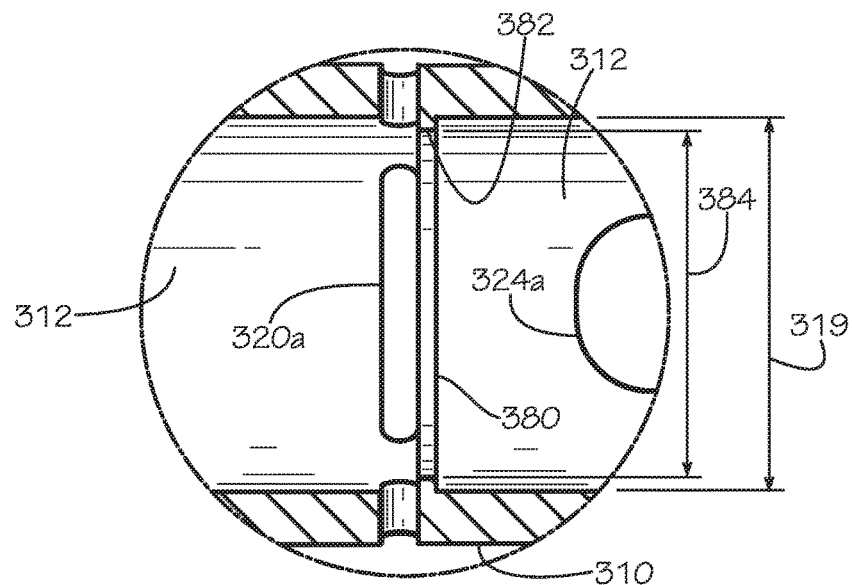
FIG. 9 is a detail view of the stem coupling of FIG. 2 taken from detail 9 of FIG. 6.

As shown in FIG. 9, the internal shoulder 380 can define a shoulder bore 382 having a shoulder bore diameter 384. The shoulder bore 382 can have a shoulder bore diameter 384 that is less than an outer diameter of an end of the upper stem 214*a* that is proximate to the stem coupling 300 and an outer diameter of the lower stem 214*b* that is proximate to the stem coupling 300. In one aspect, due to the presence of the internal shoulder 380, the stem coupling 300 can be configured to slide onto the end of either the upper stem 214*a* or the lower stem 214*b* such that each of the upper stem 214*a* or the lower stem 214*b* stops against the internal shoulder 380. In such aspect, the stem coupling does not slide past the end of the upper stem 214*a* or the lower stem 214*b*. In such aspect, the stem coupling will not be able to accidentally slide up the upper stem 214*a* or down the lower stem 214*b* and out of alignment with the fastener bores 219*a,b* or out of reach. The shoulder bore 382 can be aligned with a central axis 201 of the coupling body 310 and can defines a shoulder bore diameter 384 that is smaller than a main bore diameter 319. In another aspect, the stem coupling 300 may not comprise the internal shoulder 380.

Figure 10:
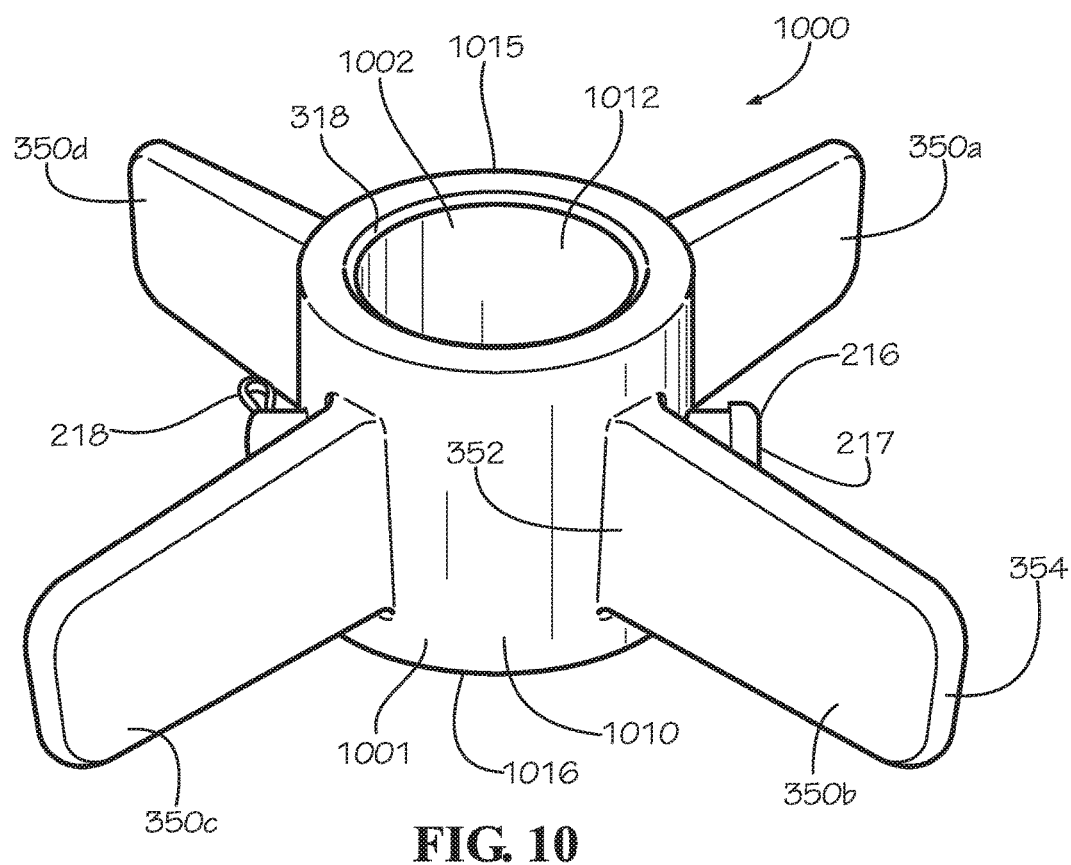
FIG. 10 is a perspective view of a spider fitting in accordance with another aspect of the current disclosure.

FIG. 10 shows a spider fitting 1000 that can be manufactured without a coupling feature for securing the upper stem 214*a* to the lower stem 214*b*. The spider fitting 1000 can comprise a spider fitting body 1010. The spider fitting body 1010 can further comprise a plurality of ribs 350*a,b,c,d*. The spider fitting body 1010 can comprise an exterior surface 1001 and an interior surface 1002, which can define a main bore 1012 extending from a first end 1015 to a second end 1016. The spider fitting 1000 can be circular in radial cross-section with the same resulting advantages as for the upper stem 214*a*, the lower stem 214*b*, and the stem coupling 300 being circular in radial cross-section. In one aspect, the main bore 1012 can be circular in radial cross-section. In another aspect, the main bore 1012 can have a non-circular shape in radial cross-section. The main bore 1012 can be sized to receive a portion of the upper stem 214*a* and a portion of the lower stem 214*b*. The spider fitting body 1010 of the spider fitting 1000 can further define clearance bores (not shown) for receiving the fastener 216. Each of the plurality of ribs 350*a,b,c,d* can extend radially outward from the spider fitting body 1010. Each of the plurality of ribs 350*a,b,c,d* can further comprise a base 352 and a tip 354 that can be distal from the base 352. As shown, the base 352 can be proximate to the spider fitting body 1010, and the tip 354 can be distal from the spider fitting body 1010. As with the plurality of ribs 350*a,b,c,d* extending from the coupling body 310 of the stem coupling 300, each of the plurality of ribs 350*a,b,c,d* of the spider fitting 1000 may comprise a tapered portion defining taper angles in each of a radial cross-section and an axial cross-section.

When the bury depth 60 of the hydrant 100 exceeds, for example and without limitation, 8 feet 5 inches, or when, for example, the fluid distribution system 80 is prone to vibration or other radially applied loads (i.e., loads such as produced by water hammer conditions that can cause the stem assembly 114 and in particular the lower stem 214*b* to deflect in a radial direction), flex in the stem assembly 114 or damage to the stem assembly 114 caused by the extended length of the stem assembly 114 can cause problems in the operation of the hydrant 100. In one aspect, the bury depth 60 can exceed 12 feet. To prevent excessive flex in the stem assembly 114 or damage to the stem assembly 114 and other components of the hydrant, the stem coupling 300 or the spider fitting 1000 can be installed on the stem assembly 114. Because of the presence of the ribs 350*a,b,c,d*, the stem assembly 114 can only flex a limited amount before one or more of the ribs 350*a,b,c,d*, contacts the internal cavity 104 of the hydrant 100. The overall diameter 507 of the stem coupling 300 or a corresponding overall diameter of the spider coupling 1000 can be made less than the inner diameter 105 of the hydrant 100 to allow rotation or axial movement of the stem assembly 114 and the spider 300 or the spider coupling 1000 within the hydrant 100. The overall diameter 507 of the stem coupling 300 or a corresponding overall diameter of the spider coupling 1000 can also be made to extend the ribs 350a,b,c,d as close as desired to the internal cavity 104 to limit any possible flexing of the stem assembly 114. In one aspect, the radial distance between the tip 354 of each of the ribs 350a,b,c,d of the stem coupling 100 or the spider fitting 1000 and the nearest portion of the internal cavity 104 of the hydrant 100 can be approximately ⅜ inch when the stem coupling 100 or the spider fitting 1000 is centered within the internal cavity 104 along a vertical axis extending through the hydrant 100. In another aspect, including when a single size of the stem coupling 100 or the spider fitting 1000 is used across multiple sizes of the hydrant 100, such radial distance can be greater or smaller than ⅜ inch.

In one aspect, a method of manufacturing the stem coupling 300 can comprise forming the coupling body 310 and forming a plurality of the ribs 350a,b,c,d, each of the ribs 350a,b,c,d extending radially outward from the coupling body 310. In one aspect, the stem coupling 300—or the spider fitting 1000—can be integrally formed through a process such as, for example and without limitation, investment casting (sometimes referred to as "lost-wax casting") or injection molding. In another aspect, the stem coupling 300—or the spider fitting 1000—can be formed by welding or by otherwise joining several components together. In one aspect, the stem coupling 300—or the spider fitting 1000—comprises and can be formed from stainless steel for its corrosion resistance and strength properties. In another aspect, the stem coupling 300—or the spider fitting 1000—can be formed from a non-stainless material such as, for example and without limitation, non-stainless steel (such as carbon steel), fiber-reinforced plastic, or any other material having desirable qualities.

In one aspect, the hydrant 100 comprises a stem coupling 300 that eliminates the need for separate holes to install a spider fitting 1000, which can eliminate an area of weakness in the stem assembly 114 and reduce the cost of manufacturing the stem assembly 114 (or its components such as the upper stem 214a and the lower stem 214b).

While a typical spider fitting (not shown) can be typically installed with difficult-to-remove fasteners above and below the spider fitting in a position within the hydrant 100 that can be difficult to reach (such as one foot below a traffic flange 160) and virtually impossible to remove, especially in the field, the spider fitting 1000 can be installed with a single fastener 216. While a typical spider fitting is manufactured by welding thin metal strips, each strip measuring a constant thickness, to the body of the spider fitting, the spider fitting 1000 and stem coupling 300 comprise the ribs 350a,b,c,d that, because they are integrally formed, do not require a time-consuming, skill-intensive secondary operation or any secondary operation at all to add. Moreover, the heat produced by welding one piece of material to another in the typical spider fitting, especially when a welded joint such as between a rib and a body of the fitting involves intensive heating of a localized area of a relatively small part, can cause distortion to the part and can cause the part to not assemble as easily to the hydrant 100 or to even require further processing before such assembly. Finally, the constant-thickness ribs of a typical spider fitting can collapse or otherwise fail in certain conditions, whereas with the spider fitting 1000 and the stem coupling 300, the tapered shape of the ribs 350a,b,c,d means that the ribs 350a,b,c,d can be thicker and therefore stronger at the base 352 where they are attached to the coupling body 310 and thinner at the tips 354 where the extra material is unnecessary. In one aspect, the thickness 364 of the radial cross-section of each rib 350a,b,c,d proximate to the tip 354 can be approximately ¼ inch, which is twice the thickness of a rib of a typical spider fitting. In another aspect, the thickness 364 if greater or small than ¼ inch. Because of, for example, the more efficient rib design and the integrally formed process that can be used to produce the stem coupling 100 or the spider fitting 1000, the stem coupling 300 can be produced at a lower cost and with a shorter lead time than with currently available products.

In one aspect, a method of installing the stem coupling 300 can comprise attaching a one of the upper stem 214a and the lower stem 214b to the stem coupling 300 at the first end 315 and attaching a one of the upper stem 214a and the lower stem 214b to the stem coupling 300 at the second end 316. In another aspect, the method of installing the stem coupling 300 can further comprise removing the stem coupling 300 and installing a second stem coupling 300 in place of the original stem coupling 300.

In addition, the stem coupling 100 or the spider fitting 1000 can be retrofitted on older hydrants. In one aspect, a single stem coupling 100 or spider fitting 1000 can be installed on the hydrant 100. In another aspect, more than one of the stem coupling 100 or the spider fitting 1000 can be installed on the hydrant 100.

In one aspect, a method of servicing the hydrant can comprise removing the stem coupling 300 or the spider coupling 1000, repairing the hydrant 100, and replacing the stem coupling 300 or the spider coupling 1000. Repairing the hydrant 100 can comprise, for example and without limitation, servicing or replacing the main valve 136.

As shown in the structure of FIG. 1, the stem coupling 300 can be made immediately accessible after removal of the upper hydrant barrel 110 by placement of the joint between the upper stem 214a and the lower stem 214b close to the traffic flange 160. After removing the stem coupling 300, service personnel can easily access and service the main valve 136 as needed, including with a seat wrench as needed. In addition to joining the upper stem 214a to the lower stem 214b, the stem coupling 300 can fail predictably and sacrificially such as when an errantly driven motor vehicle exits the road and impacts the hydrant 100 during a traffic accident. In such an event, a portion of the stem coupling 300 proximate to the first end 315 can remain attached to the upper stem 214a and a portion of the stem coupling 300 proximate to the second end 316 can remain attached to the lower stem 214b, the stem coupling 300 having torn or sheared into two separate portions due to the break-away portions 320a,b,c incorporated into the stem coupling 300. Placement of the stem coupling 300 and the joint between the upper stem 214a and the lower stem 214b slightly below the traffic flange 160 can prevent unintended opening of the hydrant 100 (due to, for example and without limitation, the weight of the motor vehicle resting on the top of the hydrant 100 proximate to the traffic flange 160), even after the upper hydrant barrel 110 and the upper stem 214a and other portions of the hydrant 100 have been torn away from the remaining portion of the hydrant 100.

One should note that conditional language, such as, among others, "can," "could," "might," or "may," unless specifically stated otherwise, or otherwise understood within the context as used, is generally intended to convey that certain embodiments comprise, while other embodiments do not comprise, certain features, elements and/or steps. Thus, such conditional language is not generally intended to imply that features, elements and/or steps are in any way required for one or more particular embodiments or that one or more particular embodiments necessarily comprise logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A hydrant comprising:
   a hydrant body defining an internal cavity;
   an upper stem positioned within the internal cavity;
   a lower stem positioned within the internal cavity; and
   a monolithic stem coupling securing the upper stem to the lower stem, the stem coupling comprising:
      a coupling body defining a main bore that is circular in radial cross-section and sized to receive the upper stem and the lower stem, the coupling body further defining an internal shoulder extending radially inward from the main bore, the internal shoulder defining a shoulder bore, the shoulder bore defining an internal diameter that is less than an outer diameter of an end of the upper stem proximate to the stem coupling and an outer diameter of the lower stem proximate to the stem coupling;
      a plurality of ribs, each rib extending radially outward from the coupling body; and
      a break-away feature, the internal shoulder defined at an edge of the break-away feature, each rib of the plurality of ribs adjacent to the break-away feature in a direction towards the lower stem.

2. The hydrant of claim 1, wherein the stem coupling comprises stainless steel.

3. The hydrant of claim 1, further comprising a first fastener coupling the stem coupling to the upper stem and a second fastener coupling the stem coupling to the lower stem, wherein each of the first fastener and the second fastener is readily-removable.

4. The hydrant of claim 3, wherein each of the upper stem and the lower stem is circular in radial cross-section.

5. The hydrant of claim 1, wherein the break-away feature extends from an exterior surface of the coupling body to an interior surface of the coupling body.

6. The hydrant of claim 5, wherein the break-away feature is a break-away slot extending circumferentially around a portion of the coupling body.

7. The hydrant of claim 1, wherein the break-away feature is a plurality of break-away features spaced circumferentially at regular intervals around the coupling body.

8. The hydrant of claim 7, wherein the number of break-away features is three.

9. The hydrant of claim 7, wherein a first end of each break-away feature is spaced away from a second end of the same break-away feature by an angular distance of about 95 degrees.

10. A monolithic stem coupling for a hydrant comprising:
    a coupling body, the coupling body configured to slide onto an end of a stem, the coupling body defining an internal shoulder extending radially inward, the internal shoulder configured to stop the stem from sliding further into the coupling body;
    a plurality of ribs; each rib extending radially outward from the coupling body and comprising a base proximate to the coupling body, and a tip distal from the base, each rib defining a taper that begins at the coupling body and terminates at the tip; and
    a break-away feature, the internal shoulder defined at an edge of the break-away feature.

11. The stem coupling of claim 10, wherein a thickness of a radial cross-section of the rib proximate to the tip is less than a thickness of a radial cross-section of the rib proximate to the base.

12. The stem coupling of claim 10, wherein a height of an axial cross-section of the rib proximate to the tip is less than a thickness of an axial cross-section of the rib proximate to the base.

13. The stem coupling of claim 10, wherein each of the plurality of ribs defines a taper angle of 1 to 3 degrees.

14. The stem coupling of claim 10, wherein each rib of the plurality of ribs is adjacent to the break-away feature.

15. The stem coupling of claim 10, wherein the coupling body comprises an interior surface defining a main bore, the internal shoulder extending radially inward from the main bore and defining a shoulder bore, and wherein the shoulder bore is aligned with a central axis of the coupling body and defines a shoulder bore diameter that is smaller than a main bore diameter.

16. The stem coupling of claim 10, further comprising a first end and a second end, wherein each of the plurality of ribs is positioned between the break away feature and the second end.

17. The stem coupling of claim 10, further comprising a first end and a second end, wherein the coupling body further defines a first cross bore positioned between the first end and the break-away feature.

18. The stem coupling of claim 17, wherein the coupling body further defines a second cross bore positioned between the second end and the break-away feature, the second cross bore oriented at a 90-degree angle with respect to the first cross bore.

* * * * *